May 28, 1935.  E. MENDENHALL ET AL  2,002,910
SUBMERSIBLE MOTOR WITH MERCURY SEALED BALANCING MEANS
Original Filed Nov. 7, 1927  2 Sheets-Sheet 1
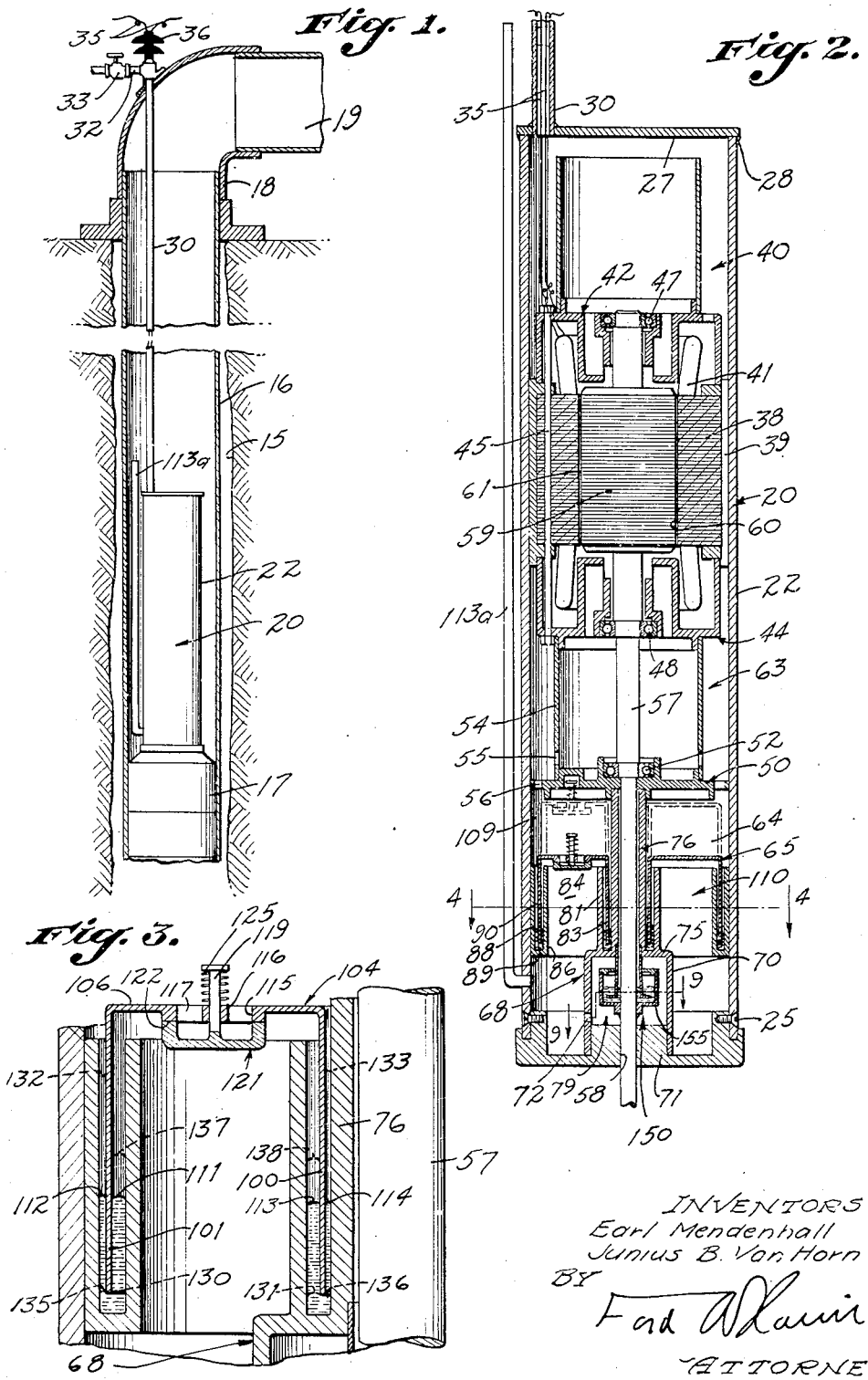
INVENTORS:
Earl Mendenhall
Junius B. Van Horn
BY
ATTORNEY.

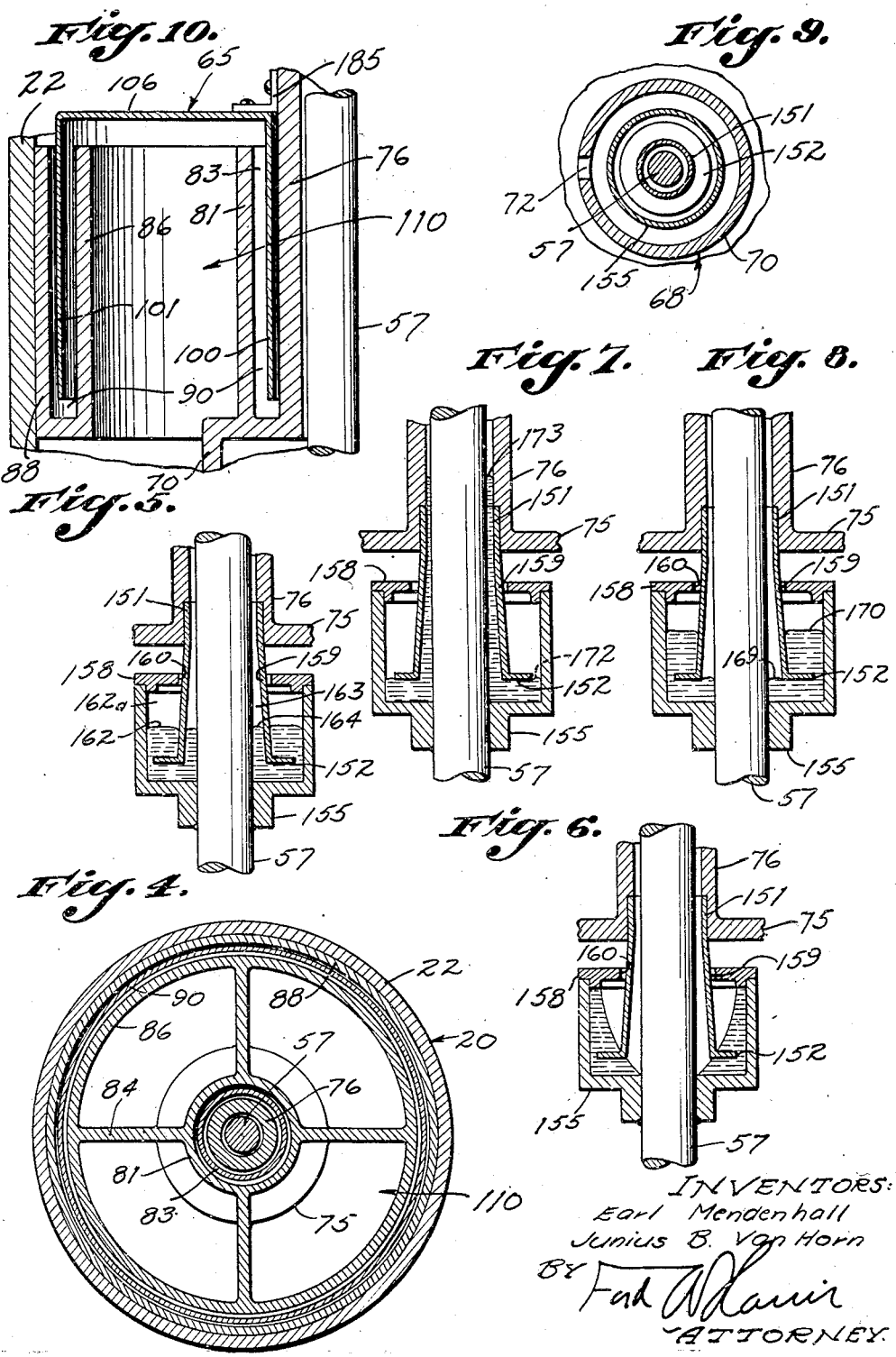

Patented May 28, 1935

2,002,910

UNITED STATES PATENT OFFICE 2,002,910

SUBMERSIBLE MOTOR WITH MERCURY-SEALED BALANCING MEANS

Earl Mendenhall and Junius B. Van Horn, Los Angeles, Calif., assignors to Menhorn, Inc., Los Angeles, Calif., a corporation of California Application November 7, 1927, Serial No. 231,513
Renewed August 3, 1932

17 Claims. (Cl. 286—9)

Previous attempts to operate a motor submerged in a fluid have not been entirely successful due to the difficulty of keeping the windings of the motor dry and preventing any of the external fluid from reaching the windings of the motor. We have found that these problems are completely solved by filling the shell of the motor with an internal neutral fluid which is non-injurious to the windings, this fluid having a low viscosity, high dielectric strength, and being a good lubricant for the bearings.

It is, of course, necessary to prevent any admixing of the internal and external fluids if the latter is to be kept from the bearings of the motor. Ordinarily the greatest tendency toward admixture will be at the junction of the shaft and the motor shell and we have found that by placing a suitable fluid-packed seal at this junction we can effectively prevent any admixture of the internal and external fluids.

Such a fluid-packed seal can most conveniently be formed by using a body of mercury to separate the internal and external fluids. Such a body of mercury has one surface in contact with the external fluid and another surface in contact with the internal fluid. Thus, should any difference in the pressures of the two separated fluids exist, there will be a tendency to force the mercury out of its sealing relationship and allow an intermixture of the fluids. It is thus desirable to effect a substantial equalization of the pressures of the fluids. One system of effecting this result is by the use of a balance chamber in which bodies of internal and external fluids are in contact. Such a system is shown and claimed in our copending application Serial No. 114,414, filed June 8, 1926, now Patent No. 1,879,625. Another system of thus substantially equalizing the pressures is to use a flexible diaphragm or bellows, such as disclosed and claimed in our copending application Serial No. 217,688, filed September 6, 1927.

In order to so equalize the pressures of the internal and external fluids in the instant application, we have found it advantageous to use a separating member, opposite sides of which are in contact with the internal and external fluids. This separating member must be movable in order to effect an equalization of pressures, and we have found it desirable to keep the edges of the separating member below the surface of bodies of mercury or other sealing fluid, allowing the member to move relative to the mercury.

It is an object of our invention to provide an improved motor which can be operated submerged in a fluid which might be injurious to the working parts of the motor should it enter therein.

Another object of our invention is to provide a shell which may enclose such a motor or other device, this shell containing an internal neutral fluid and equipped with fluid-packed devices for preventing any admixture of the external and internal fluids.

Still a further object of our invention is to provide such a shell in which the pressures of the internal and external fluids are equalized to prevent the separating fluid in the fluid-packed devices from being displaced to, in turn, prevent an intermixture of the internal and external fluid.

It is desirable to be able to supply additional internal fluid to the interior of the motor after the motor has been submerged. We provide a supply pipe adapted to supply this internal fluid to the shell, the separating member moving to allow for this added fluid and displacing a portion of the external fluid in so doing. Should the separating member be moved into a maximum position, it is desirable to provide a path of escape of the internal fluid into the external fluid.

It is a further object of our invention to provide a separating member separating an internal fluid in a submersible motor shell from an external fluid surrounding the motor shell, this separating member being movable between maximum positions and allowing a passage of internal fluid into said external fluid when the member is in a maximum position, but impeding any reverse passage of said fluids. The combination of a pressure release means and a fluid-packed sealing means is shown and claimed in our copending application Serial No. 255,544, filed February 20, 1928.

Still a further object of our invention is to provide a mercury-sealed separating member, the mercury being displaceable under sufficient difference in pressures of the fluids to allow one of the fluids to bubble therethrough, this displacement taking place relatively easily to allow a passage of said internal fluid into said external fluid, but greatly impeding a reverse passage.

In lowering the motor into the external fluid, it is desirable to prevent the interior fluid from escaping. We accomplish this by means of a pipe which joins to the bottom of the motor shell and extends to a point near the top thereof, this pipe maintaining a fluid in static balance with the internal fluid until the motor is completely submerged.

It is an object of our invention to provide a device which will prevent the escape of any internal fluid in a motor shell while the motor is being submerged.

Further objects and advantages of our invention will be made evident hereinafter.

We have illustrated one form of our invention with particular relation to the deep-well pumping art, but it is to be understood that this embodiment is for illustrative purposes only, and we do not limit ourselves to the use of the invention in this connection.

Fig. 1 shows one application of the motor of our invention.

Fig. 2 is a vertical cross-sectional view of the submersible motor of our invention.

Fig. 3 is an enlarged sectional view of a portion of Fig. 2.

Fig. 4 is a cross-sectional view taken along the line 4—4 of Fig. 2.

Figs. 5, 6, 7, and 8 are vertical cross-sectional views of the fluid-packed rotary seal.

Fig. 9 is a horizontal cross-sectional view taken on the line 9—9 of Fig. 2.

Fig. 10 is an alternative form of our invention.

Referring in particular to the drawings, Fig. 1 shows a well 15. Extending into the well is a discharge pipe 16 carrying at its lower end a pump unit 17. The upper end of the discharge pipe 16 is connected to an elbow 18 which communicates with a secondary discharge pipe 19. The motor 20 of our invention is suitably secured in the discharge pipe 16 and is adapted to rotate the impellers (not shown) of the pump unit 17 to raise water or other external fluid in the well to the surface of the ground.

Fig. 2 most clearly shows the details of the motor of our invention. The motor 20 is surrounded by a shell 22 which is closed at its lower end by a bottom member 24 suitably secured to the shell by screws 25. Closing the upper end of the shell 22 is a top member 27 which is suitably secured to the shell, such as by welding indicated at 28. Extending upward from the top member 27 is an oil-supply pipe 30. This oil-supply pipe extends upward throughout the well and through the elbow 18 at the surface of the ground. Connected to the pipe 30 above the elbow 18 is a pipe 32 having a valve 33 therein. The pipe 32 is connected to a suitable oil-pressure source. The oil-supply pipe 30 is also adapted to carry insulated leads 35 which extend through a pothead 36 at the top of the oil pipe 30. These leads 35 are adapted to supply electrical current to the windings of the motor 20.

Tightly fitting in the shell 22, and suitably held in place therein, is a stator 38 of the motor 20 having longitudinal grooves 39 spaced around the periphery thereof. These grooves 39 communicate between an upper chamber 40 above the stator 38 and a lower chamber below the stator 38. The stator 38 has windings 41 to which the leads 35 are connected.

Supported on the upper end of the stator 38 is an upper bearing member 42, and supported below the stator 38 is an intermediate bearing member 44, the upper and intermediate bearing members being suitably secured to the stator by bolts 45 extending through each bearing member and the stator 38. Upper and intermediate bearings 47 and 48 are carried respectively by the upper and intermediate bearing members 42 and 44.

A lower bearing plate 50 is supported inside the shell 22 a distance below the intermediate bearing member 44. This lower bearing plate 50 carries a lower bearing 52 which is axially aligned with the upper and intermediate bearings 47 and 48. A cylindrical baffle 54 having openings 55 therethrough extends between the intermediate bearing member 44 and the lower bearing plate 50. The lower bearing plate 50 has openings 56 therethrough, these openings communicating with the space surrounding the baffle 54.

A shaft 57 extends through the bearings 44, 48, and 52 and extends downward through an opening 58 in the bottom member 24. A rotor 59 is secured to this shaft, this rotor being adapted to rotate in an opening 60 of the stator 38, there being a gap 61 between the rotor and the stator.

The lower bearing plate 50 divides the shell 22 into a main or motor chamber 63 and a separating chamber 64. A fluid-packed seal 65 of our invention is positioned in the separating chamber 64. This seal 65 comprises a supporting structure 68 which has a lower cylindrical portion 70 engaging a boss 71 of the bottom member 24. An opening 72 is formed through this lower cylindrical portion at a point just above the boss 71. Extending across the upper end of the lower cylindrical portion 70 is a radial wall 75, and extending upward from this wall is a shaft-enclosing tube 76. This shaft-enclosing tube is concentric with the shaft 57, but spaced a distance away from the outer periphery thereof, and securely fits in a recess 78 in the lower bearing plate 50.

Also extending upward from the radial wall 75 is a cylindrical wall 81 which is concentric with the shaft-enclosing tube 76, but spaced a distance therefrom. The wall 81 and the tube 76 form an inner annular mercury chamber 83. Webs 84 extend outward from the cylindrical wall 81 and support at their outer ends a larger-diameter cylindrical wall 86. Of still greater diameter than the wall 86 is a cylindrical wall 88 which securely engages the inner periphery of the shell 22. The walls 86 and 88 are joined at their lower ends by a plate 89, these three elements defining an outer annular mercury chamber 90. The inner and outer annular mercury chambers 83 and 90 respectively are substantially half filled with mercury, as clearly indicated in Figs. 2 and 3.

Adapted to extend below the surface of the mercury in the chambers 83 and 90 are cylindrical side members 100 and 101, these side members forming a part of a separating member 104 of our invention. The upper ends of the cylindrical side members 100 and 101 are joined by an upper annular wall 106. The separating member 104 is adapted to slide vertically in the separating chamber 64. This separating member 104 at all times divides the separating chamber 64 into an internal-fluid chamber 109 and an external-fluid chamber 110 spaced respectively above and below the separating member 104. As will be clear from an inspection of Figs 2 and 3, the external fluid in the chamber 110 communicates with surface levels 111 and 113 of the mercury, while the internal fluid in the chamber 109 communicates with surface levels 112 and 114 of the mercury.

Communicating between the chamber 110 and the external fluid in the well is a filling pipe 113ᵃ which extends upward along the exterior of the shell 22 to a point a short distance above the top plate 27.

Formed in the upper annular wall 106 is an opening 115. In the center of this opening is a guide 116 held in place by ribs 117. Extending through an opening in the guide 116 is a stem 119 of a poppet valve 121. The poppet valve is adapted to engage a seat 122 of the upper annular wall 106 in a manner most clearly shown in Fig. 3. A spring 125 keeps the poppet valve 121 in fluid-tight engagement with the annular wall 106. This valve is operable when the separating member 104 is in a lowermost position to allow a passage of fluid from the chamber 109 into the chamber 110, should the pressure in the former chamber become greater than the pressure in the latter. The converse is not true, however, for should the pressure in the chamber 110 exceed the pressure in the chamber 109, the valve would not open.

The fluid-packed seal 65 of our invention also comprises a means for allowing fluid to escape from the chamber 109 into the chamber 110, or vice versa, by bubbling through the mercury, such a passage of fluid taking place only under exceptional circumstances, as will be more clearly brought out in the operation of the invention. It should be noticed that the cylindrical side member 101 is not centrally spaced in the annular mercury chamber 90, but is spaced closer to the wall 88 than to the wall 86. Similarly, the cylindrical side member 100 is spaced closer to the shaft-enclosing tube 76 than to the wall 81.

The separating member 104 is normally adapted to be slidable to equalize the pressures between the internal fluid in the chamber 109 and the external fluid in the chamber 110 and to separate these two fluids, but should any unequalized difference of pressure exist between the chambers 109 and 110, it is clear that the mercury in the annular chambers 83 and 90 would be displaced in proportion to the amount of difference in pressure. Should the pressure in the chamber 110 exceed that in the chamber 109, the mercury level 111 would be lowered and the mercury level 112 would be raised. Similarly, the level 113 would be lowered and the level 114 raised. Should the pressure in the chamber 110 be sufficiently greater than the pressure in the chamber 109, the levels 111 and 113 would be lowered into positions indicated at 130 and 131. Simultaneously, the levels 112 and 114 would be raised to levels indicated by numerals 132 and 133 in Fig. 3. At this time fluid would, of course, escape from the chamber 110 around the lower edges of the side members 101 and 100, this fluid reaching the chamber 109 by bubbling through the mercury surrounding the cylindrical side members. Conversely, if the pressure in the chamber 109 became sufficiently greater than the pressure in the chamber 110, the levels 112 and 114 would lower into positions indicated at 135 and 136 of Fig. 3. At this time the levels 111 and 113 would rise into positions indicated at 137 and 138. It should be noted that the difference in pressure in the former case would be much greater than the difference in pressure in the latter case, due to the difference in cross-sectional areas of the mercury chambers on either side of the side walls, so that it would be much easier for fluid to escape into the chamber 110 than into the chamber 109. This differential-release feature of our invention is particularly applicable in certain installations and might be used to entirely eliminate the poppet valve 121.

The lower cylindrical portion 70 and the radial wall 75 define a sealing chamber 149 in which is supported a rotary fluid-packed seal 150 of our invention. This seal is best illustrated in Figs. 2, 5, 6, 7, and 8. The rotary seal comprises an apron 151 secured to, and extending downward from, the radial wall 75. This apron is concentric with the shaft 57 and diverges at its lower end therefrom. A radial flange 152 is formed on the extreme lower end of the apron 151. Suitably secured to the shaft 57 is a cup 155 which is adapted to be substantially half filled with mercury. The lower end of the apron 151 and the radial flange 152 are adapted to extend below the surface of the mercury in the cup 155. The cup 155 has a cover 158 having a clearance space 159 between the outer edge of the apron 151 and an opening 160 through the cover 158.

When in a stationary position, all pressures being equalized, the mercury in the cup 155 stands at the same level 162 in the space 162ᵃ surrounding the apron and in the space 163 between the apron 151 and the shaft 57. The level in the space 163 is indicated by the numeral 164. When the shaft is rotating, the levels 162 and 164 assume the paraboloid shape shown in Fig. 6, but it should be noticed that the outer edges of the radial flange 152 are always beneath the surface of the mercury regardless of the rotation of the shaft.

The space 163 is indirectly in communication with the chamber 109 through the bearing 52 and the openings 55 and 56. The level 162 of the mercury in the cup 155 is in communication with the chamber 110 through the clearance space 159 and the opening 72. Thus, if the pressure in the chamber 109 became sufficiently greater that the pressure in the chamber 110, the surface 164 would be lowered into a position indicated by the numeral 169 of Fig. 8, while the level 162 would be raised into a position indicated by the numeral 170 of the same figure. In this position, fluid would escape from the chamber 109 into the chamber 110 by bubbling through the mercury. Conversely, if the pressure in the chamber 110 were greater than the pressure in the chamber 109, the level 162 would be lowered into a position indicated by the numeral 172 of Fig. 7, and the level 164 would rise into a position indicated by the numeral 173 of the same figure. In this position, fluid might escape from the chamber 110 into the chamber 109. It will be noticed that the rotary seal of our invention also has the differential-pressure-release feature, and that it is much easier for fluid to escape from the chamber 109 into the chamber 110 than it is for the fluid to pass from the latter chamber into the former, the pressure difference in the former case being proportional to the distances between the levels 169 and 170 and in the latter case being proportional to the distance between the levels 172 and 173.

It will be noticed that the fluid-packed seal 65 and the rotary fluid-packed seal 150 are both displaced by any difference of pressure which might build up between the chambers 109 and 110. In the form of the invention illustrated in Fig. 2, however, it is extremely improbable that any fluid will escape either around the cylindrical side members 100 or 101 or around the outer edges of the radial flange 152. This is because of the fact that if the pressure in the chamber 110 were to be increased over the pressure in the chamber 109, the separating member 104 would be raised from its full line position shown in Fig. 2 toward its dotted line upper position indicated by the numeral 179. The separating member 104 will, of course, only rise until the pressure in the chambers 109 and 110 are equalized. The normal operating position of the separating member 104 is near its lowermost position, as will be brought out in the operation.

In assembling the motor of our invention, the mercury chambers are filled with a proper amount of mercury. Before lowering the motor beneath the surface of the fluid in which it is to be submerged, it is desirable to fill the motor chamber 63 with a suitable oil or other internal fluid having suitable characteristics. This is most conveniently accomplished by pouring into the filling pipe 113a a sufficient quantity of the external fluid to cause the separating member 104 to assume its dotted line position 179, as indicated in Fig. 2. At the same time the interior fluid is supplied through the pipe 30. This fluid passes through the grooves 39 of the stator 38 and through the bearing 52 and into the space 163 of the rotary fluid-packed seal. This internal fluid also flows through the openings 55 and 56 thereby reaching the internal-fluid chamber 109. As more of the internal fluid is poured into the oil-supply pipe 30, the motor chamber 63 becomes filled with oil and the separating member 104 is forced into its lowermost position. Reaching this position, any excess of internal fluid will operate the poppet valve 121 and will discharge into the chamber 110. It should be understood that as the internal fluid forces the separating member 104 downward some of the external fluid previously poured through the filling pipe 113a will discharge from the top of this pipe.

It is preferable to submerge the motor when the separating member 104 is in its lowermost position. This is most clearly explained by considering the fact that as the motor is lowered the fluid pressure on the fluid in the filling pipe 113a will increase. This will force the separating member 104 upward, thus raising the level of the oil in the oil-supply pipe. The internal-fluid level in the pipe 30 will be substantially the same as the level of the external fluid in the well if the valve 33 is open, for a rise of one inch of the separating member 104 will cause a rise of many feet in the oil tube 30, due to the large differences in cross-sectional area. When the motor has been lowered into its proper position, the leads 35 are supplied with electrical potential to operate the motor 20.

If used in an installation as indicated in Fig. 1, it will be apparent that when the motor is set into operation the pump 17 will force the fluid upward in the discharge pipe 16, thus increasing the pressure on the fluid in the filling pipe 113a, and thus tending to raise the internal-fluid level in the oil-supply pipe. It is therefore preferable to force an excess of internal fluid through the oil-supply pipe 30 at this time, thus completely filling this pipe, at which time the valve 33 may be closed. If it is desired to force more internal fluid into the motor 20 when it is operating under the conditions shown in Fig. 1, it will be necessary to force this fluid under pressure through the pipe 30 by opening the valve 33.

The separating member 104 substantially equalizes the pressures of the internal and external fluids when this separating member is in any position between its maximum positions. It should be clear that the poppet valve 121 comes into play only when the separating member 104 is in its lowermost position, or if the separating member 104 should through any accident become stuck. In such an event, the differential-release feature of the fluid-packed seal 65 will also come into play, this feature allowing fluid to easily pass from the chamber 109 into the chamber 110, but requiring a larger difference in pressure to reverse this flow. This, of course, is desirable inasmuch as it would be extremely detrimental to the working parts of the motor to have any of the external fluid enter the chamber 109 and the motor chamber 63.

It should be noticed that in the preferable form of the invention shown in Fig. 2, an excess of pressure in the chamber 109 over that in the chamber 110 would have three paths of escape, should the separating member 104 become caught or otherwise rendered inoperative. The excess pressure could be relieved through the fluid-packed seal 65, or through the rotary fluid-packed seal 70, or could pass through the poppet valve 121. Thus, it should be apparent that it is not absolutely necessary to use a poppet valve 121 of the type prescribed. We prefer to use this triple combination to entirely obviate any possibility of any of these paths becoming inoperative. The poppet valve 121 is so designed that it will first release the excess of pressure in the chamber 109. It is immaterial which of the mercury seals is used to release this pressure in the event the poppet valve 121 should fail.

It should thus be apparent that our invention would be operative even though the separating member 104 should be secured rigidly in place. We have shown such an embodiment of our invention in Fig. 10 in which the separating member 104 is secured to the shaft-surrounding tube 67 by means of a bracket 185. In this embodiment of our invention we rely entirely upon the differential-release feature of the mercury seals of the invention allowing any excess of pressures to be relieved by fluid bubbling through the mercury. This embodiment of our invention is open to the objection that it is extremely difficult to keep all the external fluid out of the motor chamber 63 unless enough internal fluid is forced through the pipe 30 to always keep the pressure in the chamber 109 greater than the pressure in the chamber 110.

We claim as our invention:

1. In a device adapted to operate below the surface of an external fluid, the combination of: a shell, the interior of said shell containing an internal fluid; a fluid-sealed member separating said internal and said external fluids; and a valve in said member, said valve allowing a passage of fluid therethrough when said member is in a predetermined position.

2. In a device adapted to operate below the surface of an external fluid, the combination of: a shell, the interior of said shell containing an internal fluid; a fluid-sealed member separating said internal and said external fluids; and a pressure-operable check valve in said member, said valve allowing a passage of fluid in only one direction therethrough when the pressure on one side thereof becomes greater than the pressure on the other side thereof.

3. In a device adapted to operate below the surface of an external fluid, the combination of: a shell, the interior of said shell containing an internal fluid; walls forming annular chambers in said shell, each of said chambers containing a body of sealing liquid; and a member movable in said chambers, said member dipping into said sealing liquid and separating said internal and said external fluids.

4. In a device adapted to operate submerged in a primary liquid, the combination of: a shell adapted to be submerged in a primary liquid; walls forming a separating chamber communicating with a secondary liquid in said shell and with said primary liquid; a member separating said liquids in said separating chamber and movable through a limited path of travel to substantially equalize the pressures of said liquids; and a pressure release means for releasing a difference in pressure which may exist between said liquids in said separating chamber when said member is at the end of its path of travel.

5. In a submersible structure, the combination of: a shell; walls associated with said shell and defining a channel containing a body of sealing liquid, said walls including a pair of vertically extending side walls; and a separating member extending vertically downward into said channel and below the surface of said sealing liquid, one side of said member communicating with the interior of said shell and the other side communicating with the exterior thereof, said member lying closer to one of said side walls than to the other whereby said sealing liquid is differentially displaceable by a difference in pressure existing between the interior and exterior of said shell.

6. In a structure adapted to operate surrounded by a fluid, the combination of: a shell containing a lubricating medium; a rotatable shaft extending from said shell; a fluid-packed seal sealing the junction of said shaft and said shell; and a vertically-movable fluid-packed member separating said fluid and said lubricating medium and transferring pressure therebetween.

7. In a structure adapted to operate surrounded by a fluid, the combination of: a shell containing a lubricating medium; a rotatable shaft extending from said shell; a fluid-packed seal sealing the junction of said shaft and said shell, said seal comprising a body of sealing liquid around said shaft and an apron dipping thereinto and separating said fluid and said lubricating medium whereby said sealing liquid is displaceable by a pressure difference existing between said fluid and said lubricating medium; walls forming a separating chamber containing a body of sealing liquid, said separating chamber having access to said lubricating medium and to said fluid; and a member movable in said separating chamber and dipping into the sealing liquid therein, said member separating said lubricating medium and said fluid in said chamber and being movable to substantially equalize the pressures thereof.

8. In a structure adapted to operate surrounded by an external liquid, the combination of: a shell containing an internal liquid; a rotatable shaft extending from said shell; a seal for sealing the junction of said shaft and said shell; and walls defining a separating chamber in said shell and communicating with said internal and external liquids in a manner to contain bodies of each, there being a movable pressure-transferring body of a sealing liquid separating said bodies of internal and external liquids in said separating chamber and spaced from said rotatable shaft.

9. A combination as defined in claim 7 in which both of said bodies of sealing liquid are displaceable to allow a passage of lubricating medium or fluid therethrough upon the occurrence of a sufficient pressure differential between said lubricating medium and said fluid, and including a valve means operable to release such a differential pressure before it becomes large enough to effect such passage through either of said bodies of sealing liquid.

10. In combination: walls forming a separating chamber communicating with internal and external fluids; walls forming a pair of annular chambers in said separating chamber, said chambers being concentric relative to each other and each containing a body of sealing liquid; and a separating member separating said fluids in said separating chamber and providing inner and outer concentric cylindrical side walls respectively dipping into said bodies of sealing liquid and joined at their upper ends by an upper wall of annular shape.

11. In a device adapted to operate below the surface of a primary liquid, the combination of: a shell containing a secondary liquid and providing a separating chamber communicating with said primary and secondary liquids and containing bodies of these liquids; a rotatable shaft extending from said shell; sealing means for sealing the shaft with respect to said shell; walls in said separating chamber defining an annular channel containing a body of sealing liquid; and a pressure equalizing separating member vertically movable in said separating chamber and providing a vertically extending side wall dipping into said body of sealing liquid, said separating member and said sealing liquid separating said liquids.

12. In a submersible structure adapted to be submerged in an external liquid, the combination of: a shell providing a chamber containing a body of internal liquid; a supply pipe communicating with said chamber and extending upward to a point above the surface of said external liquid; a shaft extending from said shell; a seal between said shaft and said shell and separating said internal and external liquids; means for admitting said external liquid into said shell for substantially equalizing the pressures on opposite sides of said seal and forcing said internal liquid upward in said supply pipe until the pressure therein at the point of communication with said shell equals the pressure in said shell; and means closing the upper end of said supply pipe.

13. In a submersible structure, the combination of: a shell submerged in an external liquid and defining a chamber containing an internal liquid; a shaft extending through said shell; a fluid-packed seal for sealing said shaft relative to said shell and including a body of sealing liquid separating said internal and external liquids; means for admitting said external liquid into said shell for substantially equalizing the pressures acting on opposite sides of said seal; a surge-compensating means including a supply pipe communicating with said internal liquid in said shell and in which said internal liquid rises under the influence of said first-named means until a pressure head is developed therein at the point of communication with said shell substantially equal to the pressure in said shell, an increase of the pressure of said external liquid outside said shell thus tending to force more of said internal liquid into said supply pipe; and means closing the upper end of said supply pipe to control the pressure above the column of said internal liquid in said supply pipe, thus controlling the amount of said internal liquid entering and leaving said supply pipe.

14. In a structure adapted to operate surrounded by an external liquid, the combination of: a shell containing an internal liquid; walls in said shell defining a main chamber substantially filled with said internal liquid; a shaft means extending from said main chamber to a point outside said shell; a seal at the junction of said shaft and said shell; walls in said shell defining a space vertically disposed relative to said main chamber and containing a body of a third liquid spaced from said shaft means and providing two separated surfaces, one of said surfaces communicating with said internal liquid; and means communicating between the other of said surfaces and said external liquid whereby the pressure on said other of said surfaces varies in response to pressure changes of said external liquid and whereby said body of third liquid effectively separates said internal and external liquids.

15. In a structure adapted to operate surrounded by an external liquid, the combination of: a shell containing an internal liquid; walls in said shell defining a main chamber substantially filled with said internal liquid; a shaft means extending from said main chamber to a point outside said shell; a seal at the junction of said shaft and said shell; stationary walls defining a U-shaped space containing a U-shaped body of a third liquid in said shell and vertically disposed relative to said main chamber and providing separated surfaces, one of said surfaces communicating with said internal liquid; and means communicating between the other of said surfaces and said external liquid whereby the pressure on said other of said surfaces varies in response to pressure changes of said external liquid, said U-shaped body of said third liquid being thus between the internal and external liquids but being displaceable upon relative change in the pressures on said separated surfaces.

16. In a structure adapted to operate surrounded by an external liquid, the combination of: a shell including a main chamber substantially filled with an internal liquid; walls in said shell defining a separating chamber vertically disposed relative to said main chamber and communicating at one position with said external liquid and at another position with said internal liquid; means in said separating chamber for separating said internal and external liquids, said means including a body of a third liquid and a movable separating member associated with said body of third liquid and movable when the pressure of said external liquid changes relative to the pressure of said internal liquid; and a shaft means extending from said main chamber and from said shell.

17. A combination as defined in claim 16 including a fluid-packed seal sealing the junction of said shaft and said shell and providing a body of a sealing liquid displaceable by a pressure differential between said internal and external liquids.

EARL MENDENHALL.
JUNIUS B. VAN HORN.